Nov. 27, 1951    F. BRANDSTROM ET AL    2,576,443
PRESSURE REGULATOR
Filed Jan. 23, 1946    4 Sheets-Sheet 1
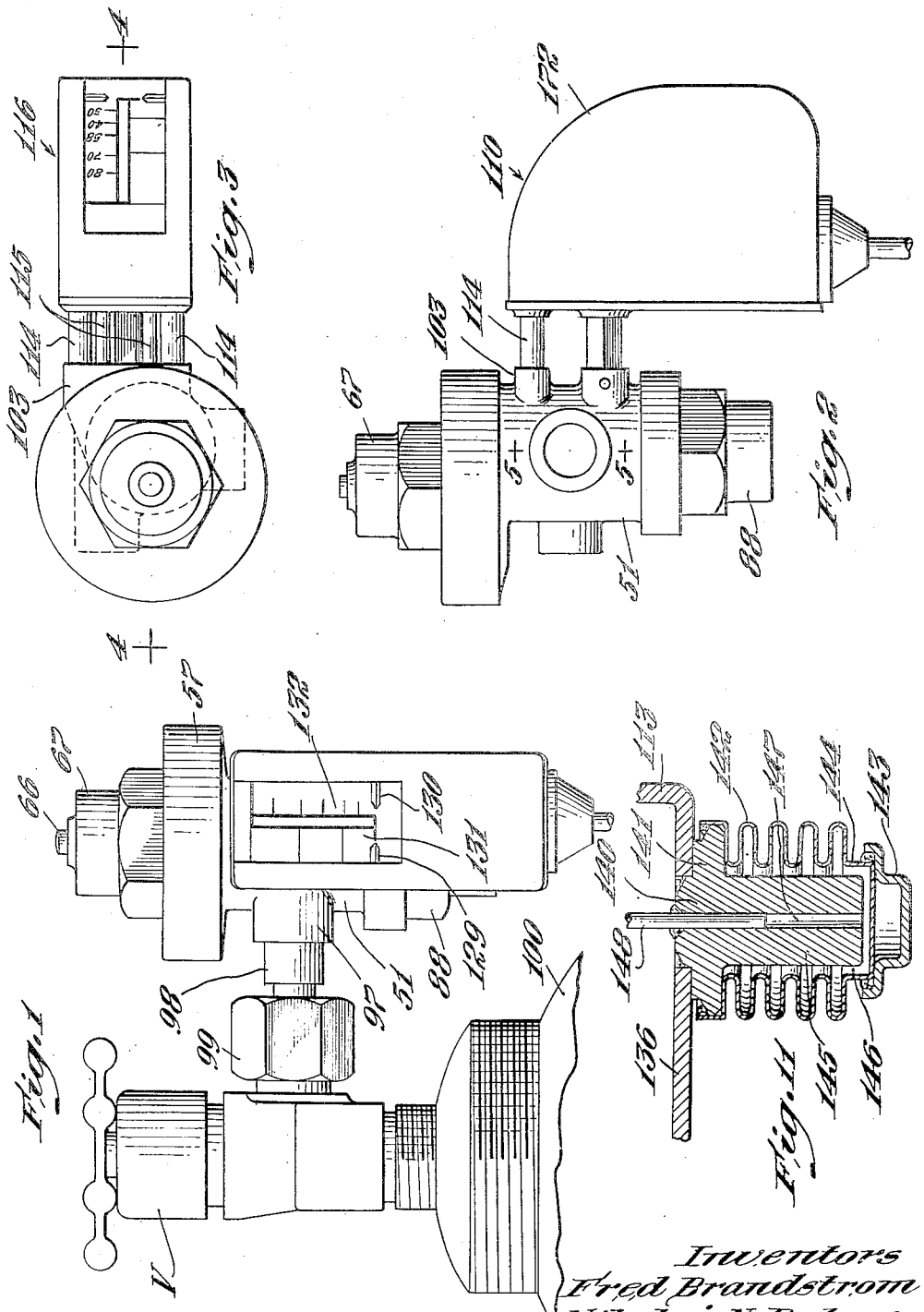

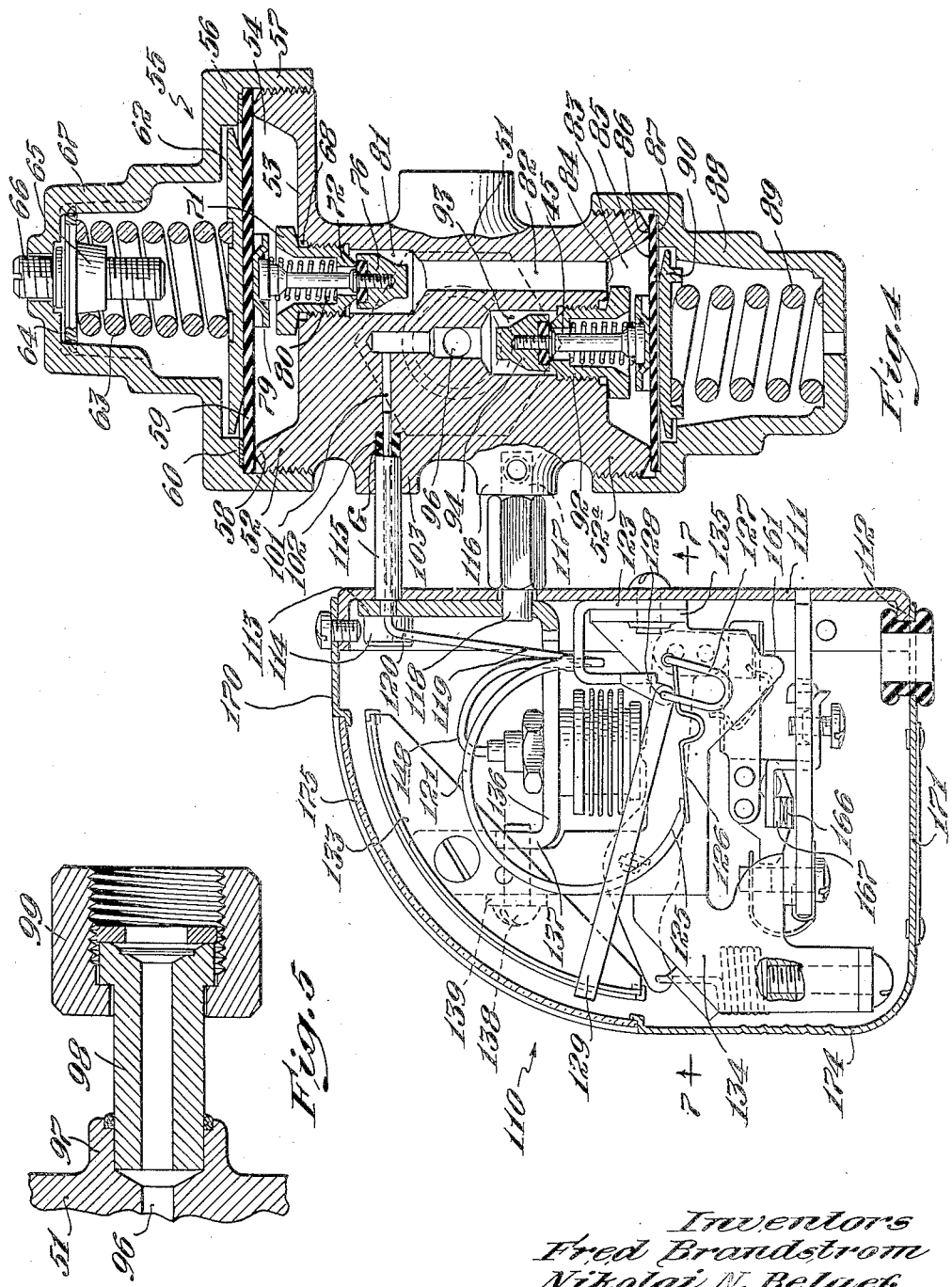

Inventors
Fred Brandstrom
Nikolai N. Belaef

Nov. 27, 1951   F. BRANDSTROM ET AL   2,576,443
PRESSURE REGULATOR
Filed Jan. 23, 1946   4 Sheets-Sheet 4
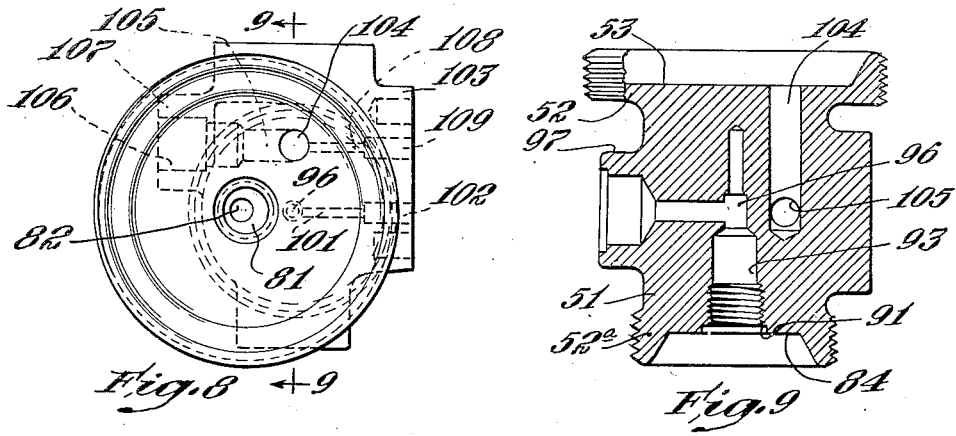
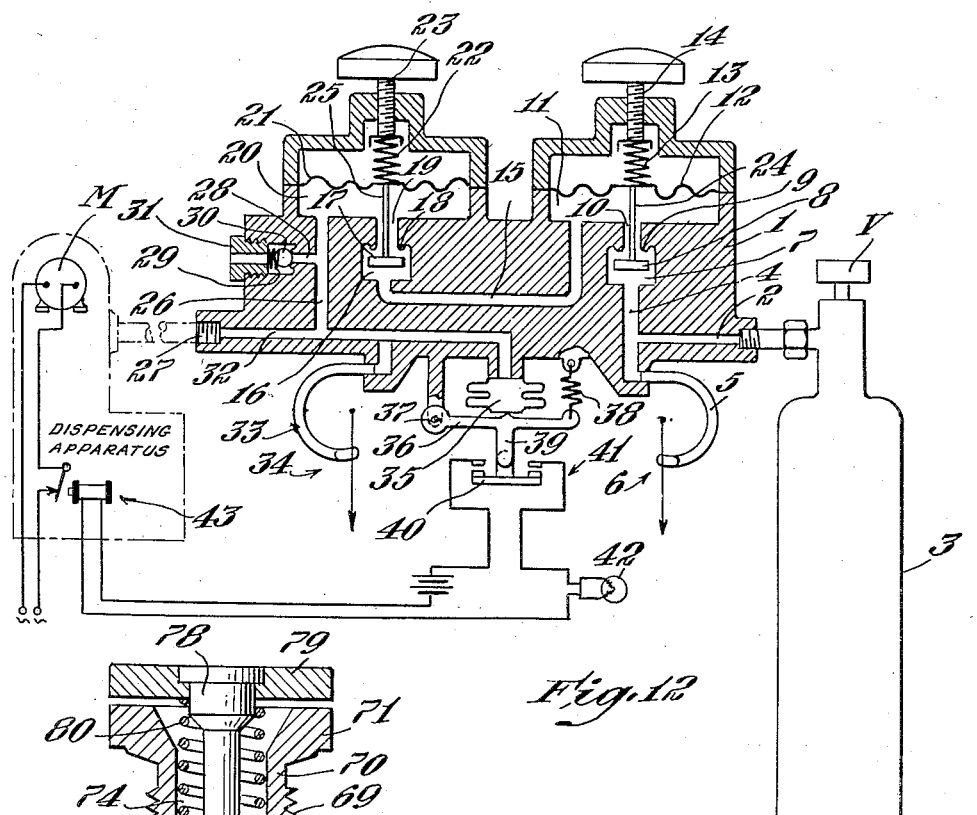
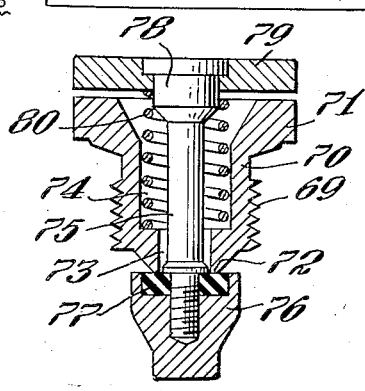
Inventors
Fred Brandstrom
Nikolai N. Belaef
by Robert Cushman Grover
att'ys.

Patented Nov. 27, 1951

2,576,443

UNITED STATES PATENT OFFICE 2,576,443

PRESSURE REGULATOR

Fred Brandstrom and Nikolai N. Belaef, Westport, Conn., assignors to Manning, Maxwell & Moore, Incorporated, New York, N. Y., a corporation of New Jersey Application January 23, 1946, Serial No. 642,814

13 Claims. (Cl. 222—63)

1

This invention pertains to apparatus for dispensing carbonated beverages and more particularly to improved means for controlling the operation of such apparatus.

Customarily, the compressed gas for aerating the liquid to be dispensed is received in a cylinder at an initial pressure of approximately 1200 lbs. per square inch, but it is desirable to maintain a pressure in the carbonating tank or chamber not substantially exceeding 65 lbs. per square inch, and it is thus necessary to reduce the gas pressure very substantially on its way from the supply cylinder to the carbonating tank. On the other hand, if the pressure in the carbonating tank drops substantially below 60 lbs. per square inch, the drink, as dispensed, may be flat and insipid. Since there is no attendant to observe the gas pressure prevailing in the carbonating tank of an automatic dispensing apparatus, it is desirable to provide automatic means operative to maintain a substantially constant and proper pressure in the carbonating tank so long as a supply of gas at high pressure is available, and to prevent the operation of dispensing whenever the gas pressure in the carbonating tank drops below that which is requisite for proper carbonating.

The principal object of the present invention is to provide improved automatic means for use in combination with apparatus for dispensing carbonated beverages, by means of which the pressure of the supply gas is reduced to the proper pressure for aerating the liquid and having associated therewith means to prevent the dispensing operation upon failure of the gas supply. Other and further objects and advantages of the invention will be pointed out in the following more detailed description and by reference to the accompanying drawings wherein—

Fig. 1 is a front elevation of the automatic pressure regulator of the present invention showing it attached to a pressure tank (the latter being broken away);

Fig. 2 is a side elevation of the apparatus of Fig. 1, the tank being omitted;

Fig. 3 is a plan view of the apparatus shown in Fig. 2;

Fig. 4 is a section to larger scale on the line 4—4 of Fig. 3;

Fig. 5 is a fragmentary vertical section, to larger scale, substantially on the line 5—5 of Fig. 2;

Fig. 8 is a bottom view of the main body casting of the pressure-regulating unit;

Fig. 9 is a section substantially on the line 9—9 of Fig. 8;

2

Figure 6:
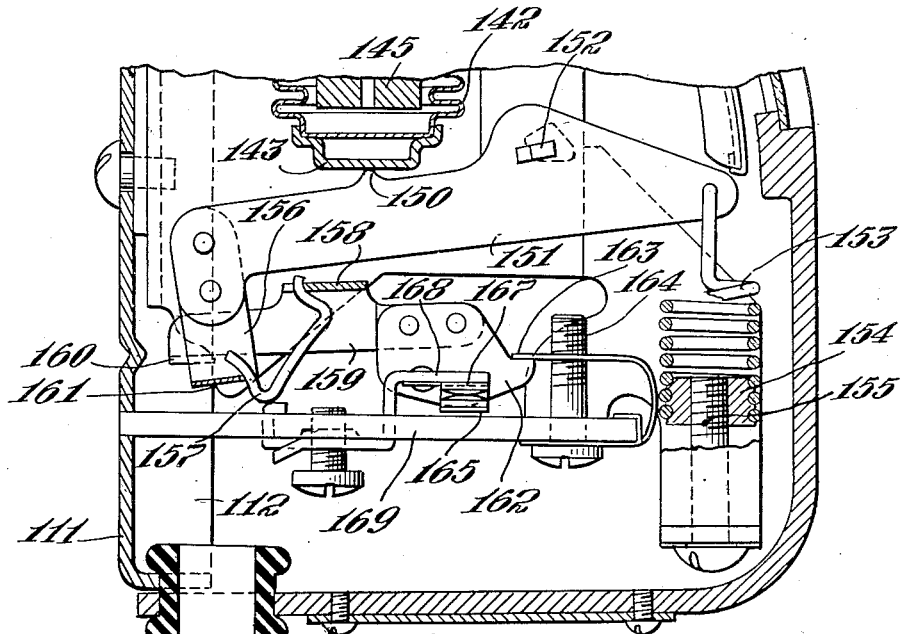
Fig. 6 is a fragmentary section in the same plane as Fig. 4, but viewed from the opposite direction, showing details of the switch.
Figure 7:
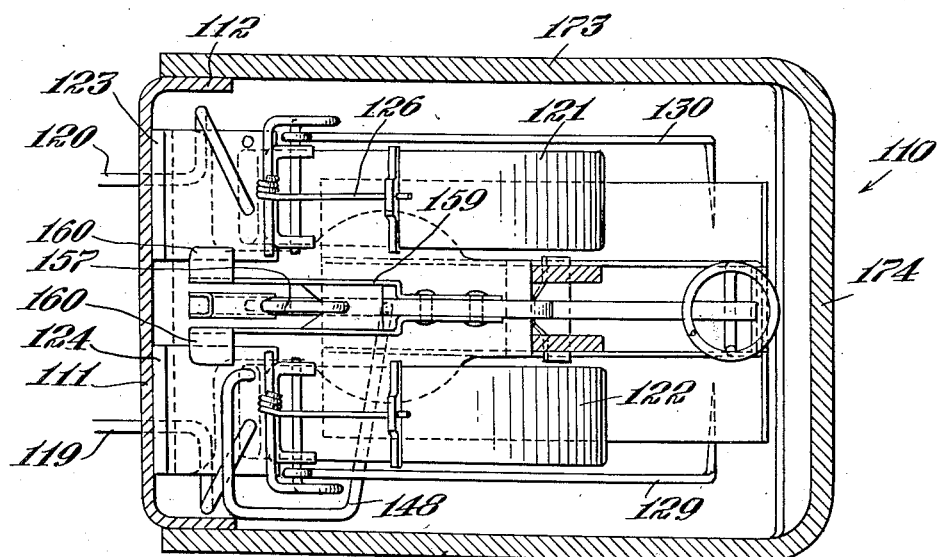
Fig. 7 is a section substantially on the line 7—7 of Fig. 4, but to larger scale.

Fig. 10 is an axial section through one of the pressure-reducing valves, to large scale;

Fig. 11 is a fragmentary vertical section showing details of the switch-actuating mechanism; and Fig. 12 is a diagrammatic view illustrating the principle of operation of the apparatus.

Referring to the drawings, in particular to Fig. 12, which in a simple diagrammatic way illustrates the principle of the invention, the numeral 1 designates a casing having therein an inlet passage 2, designed to receive pressure fluid, for instance carbon dioxide gas from a supply bottle or tank 3 of commercial type, this tank being provided at its delivery end with a manually actuable valve V. The passage 2 leads to a duct 4 whose lower end connects with a Bourdon tube 5, constituting the pressure motor of a high pressure indicator or gauge 6.

Near its upper end the duct 4 is enlarged to provide the valve chamber 7 within which is arranged a valve head 8 cooperating with an annular seat 9 to control an outlet orifice 10 leading from the chamber 7 to the motor chamber 11. The upper wall 12 of this motor chamber is movable in response to pressure variation in the motor chamber, and is here illustrated as a flexible diaphragm. A spring 13 bears against the upper surface of this diaphragm, tending to move the latter downwardly in opposition to the pressure in motor chamber 11, and an adjustable abutment screw 14 bears against the upper end of the spring, thereby providing for adjustment of the pressure exerted upon the diaphragm 12.

From the motor chamber 11 a passage 15 leads to a second valve chamber 16 within the casing and in this chamber there is arranged a movable valve head 17 which cooperates with an annular valve seat 18 to control an orifice 19 leading to a second motor chamber 20. The upper wall of the chamber 20 is formed by the diaphragm 21 which is urged downwardly by a spring 22 which may be variably compressed by a screw 23. The valve heads 8 and 17 are connected by stems 24 and 25, respectively, to the diaphragms 12 and 21, whereby, when the diaphragms rise to a predetermined extent in response to pressure increase in the corresponding motor chambers, the valve heads will be seated.

From the motor chamber 20 a delivery passage 26 extends into an internally screw-threaded boss 27 designed to receive a pipe for conveying the gas at reduced pressure to the dispensing apparatus (not shown). Preferably a branch 28 from the passage 26 leads to the valve chamber 29 of a safety valve device comprising a spring-pressed ball valve 30 which normally engages an annular seat 31, but which is unseated by excess pressure in the chamber 29. By adjustment of the tension of spring 51, which normally holds the ball valve seated, it is possible to prevent the pressure in passage 26 from rising substantially beyond that desired for dispensing, for instance 70 pounds per square inch.

Another branch 32 from the passage 26, leads to the Bourdon tube 33, constituting the motor element of a low pressure indicator or gauge 34. The passage 32 also communicates with a motor device, here shown a metallic bellows 35, whose movable end bears against the mid-portion of a lever 36 fulcrumed at 37, and which is held in contact with the movable wall of the bellows by a spring 38. The lever 36 has an arm 39 to which is connected a member 40 carrying contact elements of a double pole switch 41. This switch is in circuit with a signal device, for example a lamp 42, and with a magnetically actuated control device 43, operative when actuated, to stop the operation of the dispensing apparatus.

As thus arranged, the springs 13, 22 and 31, are manually adjusted to correspond with the pressures desired in the chambers 7 and 26. The valve V upon the bottle 3 is opened and by observing the gauges 6 and 34 it can be determined whether the desired pressures subsist in the chambers 7 and 26. The screw 23 may now be further adjusted until the desired pressure is obtained. As the gas from the bottle enters the valve chamber 7, it escapes into the chamber 11 so long as the pressure in the chamber 11 does not exceed that for which the spring 13 was adjusted. As the pressure in the chamber 11 rises the valve 8 is gradually closed, thereby reducing the flow of gas into the chamber 11 and thus automatically maintaining a substantially constant pressure in the latter. Likewise the valve 17 automatically regulates the pressure in the motor chambers 20 and 26 while the safety valve comprising the ball 30 prevents the delivery pressure in the chamber 26 from becoming excessive. On the other hand, if the pressure in the passage 26 should drop below the predetermined desired amount, the bellows motor 35 collapses, thus permitting the switch 41 to close, thus energizing the signal lamp 42 and at the same time actuating the stop device 43 so as for example to break the circuit of the driving motor M of the dispensing apparatus and thus to put the latter out of action and thereby terminate the delivery of beverage until the proper gas pressure again is available. Obviously, if preferred, the stop device 43 may act directly to shut a valve (not shown) thereby to terminate delivery of gas through passage 32.

Referring now to the other drawings, which illustrate and in greater detail show a preferred and commercial embodiment of the invention, the numeral 51 (Fig. 4) designates the casing of the pressure-reducing unit, here shown as an integral casting or forging having externally screw-threaded flanges 52 and 52ª at its upper and lower ends, respectively. The flange 52 borders a shallow cavity whose floor 53 forms the bottom or fixed wall of the pressure chamber 54 of the low pressure diaphragm-motor 55. The upper portion of the casing of the motor consists of a cap 56 having an internally screw-threaded part 57 which engages the threads of the flange 52. The upper edge of the flange 52 is shaped to constitute a seat 58 on which rests the marginal portion of a diaphragm 59 forming the upper or movable wall of the chamber 54. The cap 56 has an annular shoulder 60 designed to engage the marginal portion of the diaphragm so as to clamp the latter leak-tight against the seat 58. A rigid disk 62 rests upon the central portion of the diaphragm 59. A compression spring 63 bears at its lower end against the disk 62, while its upper end bears against the radial flange 64 of a nut 65 having threaded engagement with a screw 66 which turns freely in a bearing opening in the upper end of a bonnet portion 67 of the cap 56, the bonnet portion housing a spring 63. By rotation of the screw 66 the pressure exerted by spring 63 upon the diaphragm 59 may be varied.

A well 68 (Fig. 4) is formed in the casing body 51 coaxially with the cavity 54 and extends downwardly from the latter, the upper part of the well having internal screw threads designed to engage external threads 69 (Fig. 10) upon the exterior of a valve housing 70. This housing 70 is provided with a flange 71 at its upper end designed to engage the floor 53 surrounding the well and to receive a wrench or other tool by means of which the housing is installed. At its lower end the housing is shaped to provide an annular valve seat 72 surrounding an axial orifice 73 which opens at its upper end into a spring chamber 74 extending to the upper end of the housing 70. A valve stem 75 extends axially through the chamber 74 and the orifice 73 (the latter being of greater diameter than the stem) and has attached to its lower end the valve head 76. As shown, this head comprises an annulus 77 of resilient material, for instance rubber, designed to engage and to cooperate with valve seat 72 to close the orifice 73. At its upper end the stem 75 is provided with an enlargement to which is secured a diaphragm-engaging disk 79. This disk engages the under side of the diaphragm 59 (Fig. 4) and constitutes an abutment for the upper end of a spring 80 disposed in chamber 74, and which tends to raise the stem 75 and thereby to seat the valve element 77 against the seat 72.

The lower portion 81 of the well 68 constitutes a valve chamber for housing the valve head 76 (with clearance) and from the lower end of the well 68 a passage 82 (Fig. 4) leads down to the motor chamber 83 of a second valve-actuating motor. The upper fixed wall 84 of this chamber 83 is the roof of a shallow cavity bordered by the flange 52ª of the casing. The movable bottom wall of this lower motor chamber 83 is constituted by a flexible diaphragm 85 whose marginal portion is clamped between an annular seat 86 formed on the lower part of the flange 52ª and an internal shoulder 87 forming part of a removable cap 88 having threaded engagement with the external threads on the flange 52ª. This cap houses a spring 89 whose upper end bears against a disk 90 which underlies the central portion of the diaphragm 85. While, as illustrated, no provision is made for adjusting the spring 89, it is contemplated that adjusting means similar to that above described for adjusting the spring 63, may be provided, if desired.

The case 51 has an axial bore 91 (Fig. 9) extending upwardly from chamber 83 and which is internally screw threaded for the reception of a valve housing 92 (Fig. 4) in all respects similar to the housing 70 (Fig. 10) above described. This bore 91 (Fig. 9) merges at its upper end with a valve chamber 93 (Fig. 4) within which is a pressure-reducing valve 94 similar to valve 76, and which controls an orifice defined by the annular seat at the upper end of the housing 92. The valve chamber 93 communicates with a passage 96 (Fig. 9) having a lateral arm which extends into an external boss 97 (Fig. 5) of the casing. This boss has a socket in which is secured, for example by welding, one end of a union nipple 98 threaded at its other end for the reception of a union nut 99, by means of which the casing is connected to the supply tank or bottle 100.

The passage 96 has a second lateral arm or duct 101 (Fig. 8) leading to a bore 102 in a transversely elongate external boss 103 (Fig. 3) on the casing 51.

From the upper motor chamber 54 a bore 104 (Fig. 8) extends downwardly into the casing block. A delivery passage 105 leads from the bore 104 to a socket 106 in a boss 107 projecting from the casing body, the socket being designed to receive one end of a delivery conduit (not shown) for instance one member of a pipe union which may be secured to the casing by screw threads, welding, or the like, and by means of which the delivery passage may be connected to the dispensing or other apparatus (not shown) which is to be supplied with the gas at reduced pressure.

Associated with the pressure-reducing unit above described is a control unit 110 (Figs. 2, 3, 4, 6 and 7). The operative mechanism of the latter unit is housed in a case which comprises the rear plate 111 (Figs. 4, 6 and 7), here shown as sheet metal and having a marginal forwardly directed integral flange 112. To the forward face of the plate 111 there is secured, for example by welding, the vertical rear leg 113 of a motor supporting bracket. This bracket 113 is provided with two horizontally spaced holes aligned with holes in the plate 111, for the reception of screws 114 which enter threaded sockets in the elongate boss 103 of the pressure-reducing unit, thereby to unite the two units. Intermediate the holes which receive the screws 114, the plate 111 is provided with a pair of horizontally spaced holes which, when the units are assembled, are axially aligned with the sockets 102 and 109, respectively (Fig. 8), in the boss 103. Before assembling the units, spacer sleeves 115 are introduced into the sockets 102 and 109, respectively. The left-hand ends of the spacer sleeves are disposed in the holes in the plate 111 and abut the legs 113, while the right-hand ends of the sleeves abut compressible annular gaskets G at the inner ends of sockets 102 and 109, the gaskets providing a pressure-tight seal.

At a point below the boss 103, the casing 51 of the reducing unit is provided with a boss 116 having therein a socket which receives the end 117 of an adjusting spacer or strut whose opposite screw-threaded end 118 passes freely through an opening in the part 111 and engages a threaded opening in part 113. The midportion of this adjustable spacer is preferably shaped to receive a wrench whereby the spacer may be turned, thus varying its effective length, and thereby making it possible to adjust the unit 110 accurately with respect to the casing 51.

Tubes 119 and 120 extend through openings in the member 113 and through the spacer sleeves 115 and are removably seated leak-tight in the passages 101 and 108. At their opposite ends these tubes 119 and 120 communicate with the interior of a pair of Bourdon tubes 121 and 122 (Fig. 7), the rear ends of the Bourdon tubes being fixed to corresponding brackets 123 and 124, attached to the plate 111. The free end 125 of each Bourdon tube has a tip bracket 126 which is connected to a U-shaped crank arm 127 fixed to a pivot member 128. The pivot members carry pointers 129, 130, respectively, cooperating with suitable scales 131 and 132 (Fig. 1) to indicate the pressures in the chambers 93 and 54, respectively. These scales 131 and 132 are carried by supports 133 (Fig. 4) mounted on a bracket 134 having a part 135 secured to the plate 111.

The motor-supporting bracket, comprising the vertical leg 113, has a horizontal arm 136 (Fig. 4) provided at its forward end with a lug 137 which is secured by means of a screw 138 to a tie bar 139 connecting the supports 133.

The horizontal arm 136 of the motor bracket has an aperture which receives the upper end of a block 140 (Fig. 11) which is welded to the bracket, this block 140 having a radial flange portion 141, below the bracket to which is brazed or soldered the upper end of a metallic bellows or diaphragm 142. This diaphragm has a stiff head member 143, welded or brazed to its lower movable end 144. The block 140 preferably comprises a cylindrical portion 145 extending down into the bellows thereby to prevent the latter from buckling sidewise, and, with the bellows, defining the expansible motor chamber 146. The block 140 has a axial bore 147 leading to the chamber 146 and a tube 148 of small diameter is soldered or brazed into the upper end of this bore and is connected to the tube 119 which communicates with the low pressure chamber.

The rigid movable lower head 143 of the bellows 142 bears against a lug 150 (Fig. 6) projecting from the upper edge of a lever 151 arranged to turn about a knife-edge fulcrum member 152 carried by the bracket 134. The upper end of a tension spring 153 is secured to the right-hand end of the lever 151 (Fig. 6). The lower end of the spring is attached to a nut 154 adjustable vertically by means of a screw 155. The left end of the lever (Fig. 6) is provided with a downwardly directed leg 156 which bears against one leg of a U-shaped spring member 157. The opposite leg of this spring, which is always under some tension, bears against the rear edge of a bridge member 158 forming part of a duplex switch lever 159 having ears 160 at its forward end which fulcrum about vertical edge surfaces 161 (Fig. 4) forming parts of the bracket 134. The rear end 162 of the lever 159, underlies a spring stop 163 whose vertical position may be varied by turning a screw 164. Intermediate its ends the lever 159 carries a bracket arm 165 (Fig. 6) which supports the lower movable contact 166 (Fig. 4) of an electric switch. The upper fixed contact 167 (Fig. 6) is carried by a bracket 168 mounted upon an insulating base 169 supported by bracket 134.

The parts are so devised that the fulcrum point where the part 160 of switch lever 159 engages the surface 161, is on the neutral axis of the spring 157 so that the spring is tensioned by moving its lower end toward the fulcrum point from either direction. Thus if the lower end 156 of lever 151 be raised from its lowermost position, the spring 157 will gradually be put in tension and then as the neutral axis of the spring is passed, the spring will again expand, thus suddenly throwing the end 162 of lever 159 downwardly so as to separate the contacts 166 and 167. Reverse motion of the part 156 will snap the contacts together.

The case of the unit 110 also comprises top and bottom wall members 170 and 171 (Fig. 4), side wall members 172 and 173 (Fig. 7) and a front wall member 174 (Fig. 4), the latter having an aperture for the reception of a transparent panel 175.

The operation of the device illustrated in Figs. 1 to 11 inclusive is substantially as described with respect to the more simple construction shown in Fig. 12. Pressure fluid, for example, carbon dioxide at high pressure, for instance 1200 lbs. per square inch, is admitted from the tank or bottle 100 to the valve chamber 93. The spring 89 is so selected, if not adjustable, as to hold the valve 94 away from its seat while the pressure in chamber 83 is rising to a predetermined pressure. In response to a further increase in pressure, the diaphragm 85 rises gradually so as to close the orifice 95 and thus throttle the gas. Gas from chamber 83 passes through duct 82 (Fig. 8) into valve chamber 81 and as the pressure builds up in the motor chamber 54 the diaphragm 59 gradually moves the valve 76 to throttle the gas passing through the orifice 73. Gas from chamber 54 flows through passages 104 and 105 to the delivery pipe (not shown) which conducts it to the dispensing apparatus. During all of this time the pressure in chambers 93 and 54 is indicated by the pointers 131 and 132. By watching this pressure and adjusting the screw 66, the pressure of delivery of the gas may be regulated very accurately. The switch parts are so adjusted that so long as the desired delivery pressure is maintained, the bellows 142 is expanded by the internal pressure and the switch lever is held in switch-closing position against the urge of spring 153. However, if due to the exhaustion of the gas supply, or for other reason, the pressure at the delivery should drop to a point such that carbonation of the beverage in the dispensing apparatus is insufficient, the bellows 142 collapses and the spring 153 swings lever 151 thereby tensioning spring 157 and snapping the switch contacts apart, thus stopping the operation of the dispensing apparatus, it being understood that some means, not shown, in electrical circuit with the switch contacts 166 and 167 acts to stop or prevent operation of the dispensing apparatus and thus to terminate the delivery of beverage when the circuit is broken.

While one desirable embodiment of the invention has been herein disclosed by way of example, it is to be understood that the invention is broadly inclusive of any and all modifications falling within the scope of the appended claims.

We claim:

1. In combination with motor-driven dispensing apparatus for dispensing carbonated beverage, regulating means having a casing provided with an inlet passage designed to receive gas from a supply at high pressure, said passage leading to a valve chamber, a valve seat defining an orifice for the escape of gas from said chamber, a valve controlling said orifice, a passage leading from said orifice to a motor chamber having a movable wall, means connecting said wall to the valve, an adjusting spring for loading said wall, a passage leading from the motor chamber to a second valve chamber, a valve seat defining an orifice for the escape of gas from said second valve chamber, a valve controlling said latter orifice, a passage leading from said latter orifice to a second motor chamber having a movable wall, a spring loading the movable wall of said second chamber, means connecting the latter movable wall to the second valve, a delivery passage leading from the second motor chamber, a pressure motor communicating with said delivery passage, and means actuated by said latter motor in response to abnormally low pressure in the delivery passage to break the motor circuit of the dispensing means.

2. In combination with motor-driven apparatus for dispensing carbonated beverage, a pressure-reducing unit and a control unit, each of said units having a casing, the casings having aligned sockets in their outer surfaces, compressible gaskets in the bottoms of said sockets, tubular spacers having their ends seated in the sockets of the respective casings and bearing against the gaskets, bolts detachably uniting the casings, and gas-conducting tubes passing through the tubular spacers from one casing to the other.

3. In combination with motor-driven apparatus for dispensing carbonated beverage, a pressure-reducing unit and a control unit, each unit having a casing, each casing having two horizontally spaced sockets in its outer surface, a compressible annular gasket in the bottom of each socket of one casing at least, tubular spacers having their opposite ends seated in the sockets of the respective casings, one end of each spacer engaging a gasket which provides a pressure-tight seal, an adjustable strut interposed between the casings, the strut being located at a substantial distance from a plane defined by the axes of said sockets, bolts detachably uniting the casings, and gas-conducting tubes extending through the tubular struts from one casing to the other.

4. In combination with motor-driven apparatus for dispensing carbonated beverage, a pressure-reducing unit and a control unit, each unit having a casing, each casing having two sockets in its outer surface, tubular spacers having their opposite ends seated in the sockets of the respective casings, a strut secured to one casing and detachably engaging the other, said strut being of adjustable effective length and being so arranged relatively to the tubular spacers as to provide a three-point bearing between the casings, bolts detachably uniting the casings, and gas-conducting tubes passing through said tubular spacers from one casing to the other.

5. In combination with motor-driven apparatus for dispensing carbonated beverage, a pressure-reducing unit and a control unit, the pressure-reducing unit having inlet and delivery passages, the control unit having therein a pressure-responsive motor and means actuable thereby to break the motor circuit of the dispensing means, means detachably uniting the units, and means providing communication between the delivery passage of the reducing unit and the pressure motor of the control unit.

6. In combination with motor-driven means for dispensing carbonated beverage, a pressure reducing unit and a control unit, the pressure-reducing unit having inlet and delivery passages and valves for throttling the gas flowing through said passages, the control unit having therein a pressure-responsive motor and means actuable thereby to break the motor circuit of the dispensing means, bolts detachably uniting the units, tubular spacers for holding the units in properly spaced relation and a duct passing through one of said tubular spacers and providing leak-tight communication between the delivery passage and the pressure motor in the control unit.

7. In combination in dispensing apparatus of substantially conventional type designed automatically to dispense carbonated beverage and wherein a liquid is aerated with carbon dioxide gas under pressure before it is dispensed and wherein the dispensing of the beverage is dependent upon the operation of an electromagnetic motor having a normally closed switch in its supply circuit, regulating means designed to receive gas at high pressure from a supply and to deliver it at a predetermined lower pressure to the dispensing apparatus, and pressure-responsive means operative to open said switch in the motor circuit thereby to terminate delivery of beverage from the dispensing apparatus when the delivery pressure of the gas falls below a predetermined minimum.

8. In combination with motor-driven apparatus for dispensing carbonated beverage, regulating means designed to receive gas at high pressure from a supply and to deliver it at a predetermined lower pressure to the dispensing apparatus, a pressure motor responsive to delivery gas pressure, and means operative by said pressure motor to prevent operation of the motor of the dispensing apparatus if the delivery gas pressure falls below said predetermined value.

9. In combination with dispensing apparatus of substantially conventional type designed to dispense carbonated beverages and wherein a liquid is aerated with carbon dioxide gas under pressure before it is dispensed and which has parts which are actuated by an electric motor to effect the dispensing operation, regulating means of the kind which receives carbon dioxide gas from a high pressure supply and by stages reduces the pressure to a pressure suitable for delivery to the dispensing apparatus, a movable pressure-responsive control element exposed to the delivery gas pressure and which remains stationary so long as the delivery gas pressure is sufficiently high for carbonization, said part moving in response to drop in the delivery gas pressure below normal, and means operative to break the circuit of the dispensing apparatus motor when said control element so moves.

10. In combination with dispensing apparatus of substantially conventional type designed to dispense carbonated beverages and wherein a liquid is aerated with carbon dioxide gas under pressure before it is dispensed and which has parts which are actuated by an electric motor to effect the dispensing operation, regulating means of the kind which receives carbon dioxide gas from a high pressure supply and reduces the pressure to a pressure suitable for delivery to the dispensing apparatus, a fluid pressure motor responsive to delivery gas pressure, and a snap-action switch controlling the circuit of the dispensing apparatus motor and which is normally held in circuit-closing position by the pressure motor, the parts being so constructed and arranged that when the delivery pressure drops below normal, the fluid pressure motor responds and the switch opens to break the motor circuit.

11. Control means for apparatus driven by an electric motor and operative to dispense carbonated beverage, said control means comprising in combination a device operative to receive carbon dioxide at high pressure from a supply and to deliver the carbon dioxide at a regulable predetermined lower pressure, a switch normally closing the circuit of the motor of the dispensing apparatus, means tending to open the switch, and a metallic bellows exposed to the gas delivery pressure and operative to prevent opening of the switch so long as said predetermined delivery pressure is maintained.

12. Control means for apparatus driven by an electric motor and operative to dispense carbonated beverage, said control means comprising a device operative to receive carbon dioxide gas at high pressure from a supply and to deliver it to the dispensing apparatus at a regulable predetermined lower pressure, a snap-action switch normally closing the circuit of the motor of the dispensing apparatus, a spring which tends to move the switch to open the circuit, means for adjusting the tension of the spring, and a pressure motor responsive to the delivery pressure and operative to prevent opening of the switch so long as the delivery pressure remains at or above said predetermined pressure.

13. In combination with motor-driven apparatus for dispensing carbonated beverage, regulating means comprising a pressure-reducing unit, a control unit, having inlet and delivery passages, means for detachably uniting said units, means providing ducts including separable parts providing communication between the inlet and delivery passages of the reducing unit and corresponding passages in the control unit, a pressure motor within the control unit, said motor being in communication with the delivery passage of the reducing unit, and means whose operation is dependent upon said pressure motor, for preventing operation of the motor of the dispensing apparatus in response to abnormally low pressure in the delivery passage of the reducing unit.

FRED BRANDSTROM.
NIKOLAI N. BELAEF.

REFERENCES CITED

The following references are of record in the file of this patent:

UNITED STATES PATENTS

| Number | Name | Date |
|---|---|---|
| 1,659,263 | Harris | Feb. 14, 1928 |
| 1,974,857 | Winton | Sept. 25, 1934 |
| 2,005,445 | Wiedhofft | June 18, 1935 |
| 2,054,481 | MacLean | Sept. 15, 1936 |
| 2,057,133 | Bryce | Oct. 13, 1936 |
| 2,082,227 | Stettner | June 1, 1937 |
| 2,199,661 | Gamble et al. | May 7, 1940 |